Sept. 29, 1953 G. E. MORTON 2,654,034
CIRCUIT TUNING DEVICE
Filed May 31, 1951

INVENTOR.
GEORGE E. MORTON
BY Hudson, Boughton,
Williams, David & Hoffmann.
ATTORNEYS Patented Sept. 29, 1953

2,654,034

UNITED STATES PATENT OFFICE 2,654,034

CIRCUIT TUNING DEVICE

George E. Morton, North Royalton, Ohio, assignor to Designers For Industry, Inc., Cleveland, Ohio, a corporation of Ohio Application May 31, 1951, Serial No. 229,067

3 Claims. (Cl. 250—40)

This invention relates to radio circuit tuning devices and, as one of its objects, aims to provide an improved device of this kind which is of a simple, economical and compact construction but which will afford very sensitive tuning over a wide range of signal frequencies.

Another object is to provide an improved circuit tuning device of this character embodying a variable inductance and a variable capacitance, and in which a single actuating mechanism of a novel form serves both the variable inductance and the variable capacitance.

A further object is to provide an improved circuit tuning device of the character mentioned in which the actuating mechanism comprises relatively rotatable coaxial sleeves and a carrier member movable axially thereof, and in which cooperating slot and follower means produce the axial movement of the carrier member in response to the relative rotation between the sleeves.

Still another object is to provide an improved tuning device of the kind above indicated in which the slot means comprises an axial slot in one of the sleeves and a helical slot in the other sleeve extending in crossing relation to the axial slot, and in which the follower means includes a member engaging in both slots at their point of crossing relation.

The invention can be further briefly summarized as consisting in certain novel combinations and arrangements of parts hereinafter described and particularly set out in the claims hereof.

In the accompanying sheet of drawings.

Figure 2:
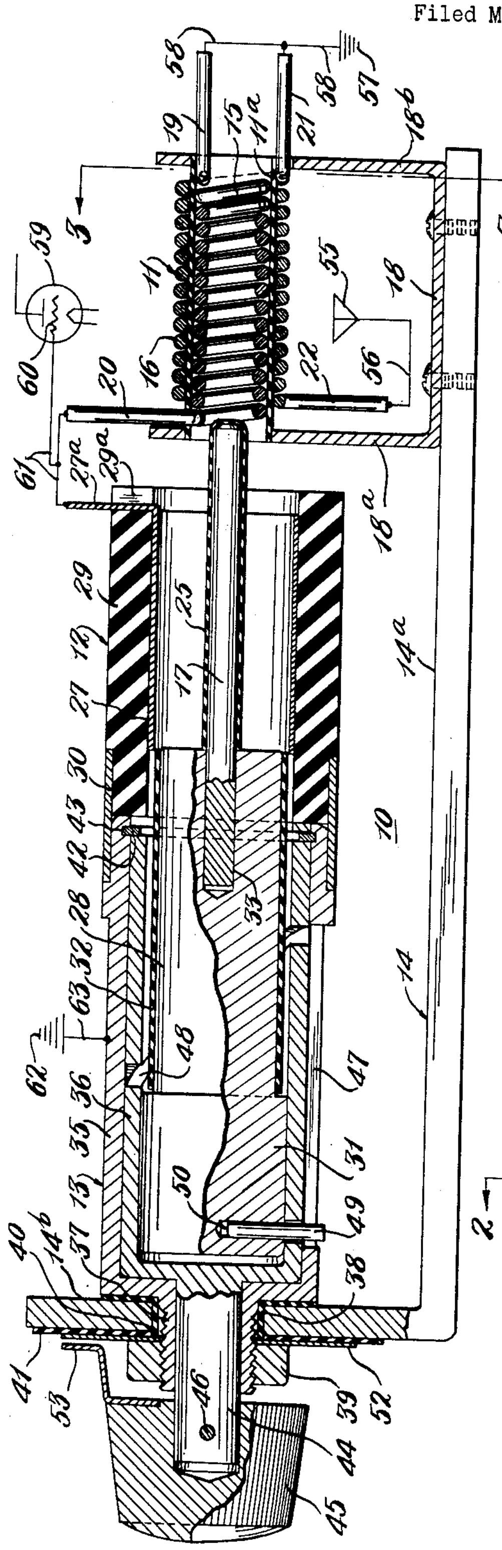
Fig. 2 is a longitudinal vertical section taken through the device substantially as indicated by section line 2—2 of Fig. 1.
Figure 4:
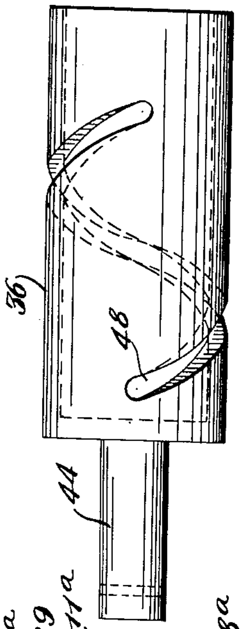
Fig. 4 is a side elevation showing one of the sleeves of the actuating mechanism in detached relation.
Figure 3:
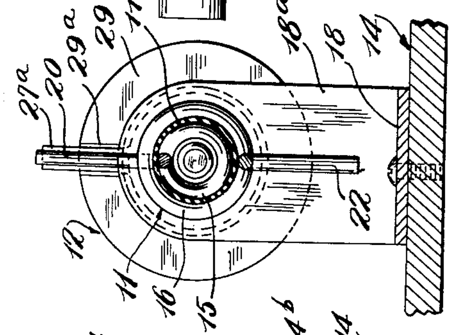
Fig. 3 is a transverse section taken through the device substantially on section line 3—3 of Fig. 2.
Figure 1:
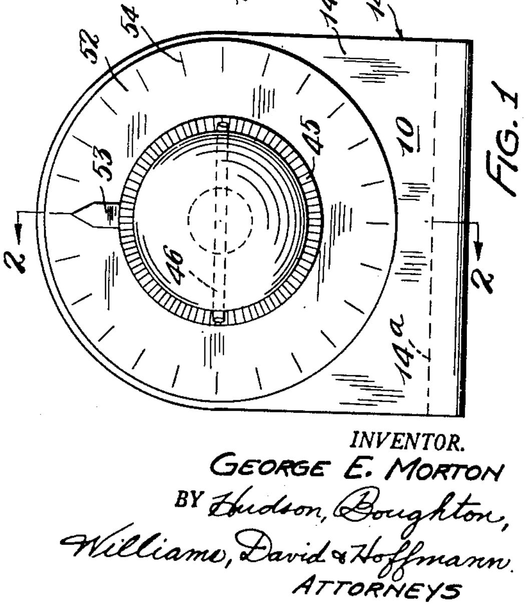
Fig. 1 is a front elevation of a tuning device embodying the present invention.

As one practical embodiment of this invention, the drawing shows the improved radio circuit tuning device 10 as comprising in general a variable inductance device 11, a variable capacitance device 12 and an actuating mechanism 13 operable to simultaneously vary the inductance and capacitance values of the devices 11 and 12. The tuning device 10 also includes a suitable base or support 14 forming a mounting means for these devices and which may be a portion of the chassis of a radio apparatus or the like, and here as shown comprises horizontal and vertical wall portions $14^a$ and $14^b$.

In the embodiment of the tuning device 10 here shown, the variable inductance device 11 is mounted on the horizontal wall portion $14^a$ of the support 14 and the actuating device 13 is mounted on the upright wall portion $14^b$. The devices 11, 12 and 13 are disposed in a substantially axially aligned relation in which the variable capacitance device 12 is disposed between the variable inductance device 11 and the actuating mechanism 13 and is supported by the latter.

The variable inductance device 11 is in the form of a hollow coil means comprising an inner coil or helix 15 and an outer coil or helix 16 disposed in a surrounding coaxial relation to the inner coil. This variable inductance device 11 also comprises a core member 17 which will be further described hereinafter and which is movable into the hollow coil means.

The coils 15 and 16 are supported by an insulating sleeve or tube $11^a$ with the inner coil 15 disposed inside the sleeve and the outer coil 16 disposed around the sleeve. The inner and outer coils 15 and 16 can be in the relation of primary and secondary coils of an inductive coupling device or transformer. Although the inductance coil means is here shown as including a plurality of coils 15 and 16, it is not necessary that the device always comprise multiple coils inasmuch as the inductance coil means may comprise a single coil or helix, or may comprise an auto transformer having coil sections inductively coupled by mutual inductance.

The coil means of the inductance device 11 can be suitably mounted on the horizontal wall portion $14^a$ of the support 14 as by means of a bracket 18 having spaced upright parallel arms $18^a$ and $18^b$ with which the ends of the insulating sleeve $11^a$ are connected as by engaging in openings thereof. The inner coil 15 has opposite ends thereof projecting outwardly therefrom and forming a pair of leads or terminals 19 and 20 to which further reference will be made hereinafter. Similarly, the outer coil 16 has projecting end portions forming another such pair of leads or terminals 21 and 22.

The core 17 of the variable inductance device 11 is here shown as being in the form of a stem which is axially movable into and out of the magnetic field of the hollow coil means, preferably by being axially movable into and out of the inner coil 15. This core member can be made of either a non-ferrous metal such as copper or aluminum or can be made from a ferrous metal such as iron, but is preferably formed from a combination of finely divided iron such as carbonyl iron and a binder such as polyvinyl resin or other suitable plastic. When the core member is made from such a combinatioin of carbonyl iron and a binder, it can be readily molded to the desired shape such as the stem 17 here shown, and during the use thereof the finely divided iron produces the effect of a laminated core member.

The core member 17 is preferably provided with an insulating cover 25 which isolates the core stem from metallic contact with the inner coil 15 when this stem is moved into the latter. The covering 25 can be of any suitable insulating or dielectric material, such as polystyrene or other suitable plastic, and can be molded in place on the core member in surrounding relation thereto.

The capacitance device 12 comprises an outer capacitance member 27 of suitable surface area for the capacitance value desired and an inner capacitance member 28 movable relative thereto and also having suitable surface area. The outer capacitance member 27 comprises a sleeve made of a metal having good electrical conductivity, preferably a non-ferrous material such as copper or aluminum, and preferably has a thin plating of silver (not shown) thereon. The outer capacitance member 27 can be suitably supported, but preferably as here shown, this capacitance member is supported by being mounted in an insulating sleeve or barrel 29 which is, in turn, supported by the inner end of the actuating device 13.

The mounting sleeve 29 can be formed of a suitable insulating material or dielectric, such as polystyrene or any other suitable plastic. The mounting sleeve 29 has the outer end thereof connected with the inner end of the actuating device 13 as by means of a mounting ferrule 30. As thus supported, the outer capacitance member 27 is disposed between the actuating device 13 and the variable inductance device 11 and in substantially coaxially aligned relation with these devices.

The inner capacitance member 28 comprises a substantially cylindrical body constituting an axial projection of a carrier member or plunger 31 to which further reference will be made hereinafter. The inner capacitance member 28 is of a size to be axially movable into closely spaced telescoping relation to the outer capacitance member 27. Although the inner capacitance member 28 could be a hollow metal member or sleeve, it is preferably a solid cylindrical body as here shown. The inner capacitance member 28 is made of a metal having good electrical conductivity, preferably a non-ferrous metal such as copper or aluminum and preferably has a thin plating of silver (not shown) thereon.

This inner capacitance member 28 is provided with an insulating cover 32 for insulating the same from metallic contact with the outer capacitance member 27 when the inner capacitance member is moved axially into the latter. The covering 32 can be made of any suitable insulating material or plastic such as polystyrene and can be molded in place or otherwise affixed to the inner capacitance member in surrounding relation thereto.

In addition to forming a part of the variable capacitance device 12, the inner capacitance member 28 also forms a support for the core member 17 and connects the latter with the carrier member 31. The core member 17 is here shown as being mounted on the inner capacitance member 28 by having one of its ends engaged in an opening 33 of this capacitance member.

To provide for connection of an electric circuit with the outer capacitance member 27, this member preferably has a terminal lug $27^a$ formed on the inner end thereof which extends through a radial slot $29^a$ of the mounting sleeve 29.

The actuating device 13 serving both the variable inductance device 11 and the variable capacitance device 12, constitutes an important part of the present invention and comprises a pair of coaxially nested outer and inner sleeves 35 and 36, and the above-mentioned carrier member or plunger 31 which is axially slidable in the inner sleeve. The outer sleeve 35 is provided a hollow stem 37 by which the actuating device is adapted to be mounted on the upright portion $14^b$ of the support 14. The hollow stem 37 projects forwardly through an opening 38 of the upright wall $14^b$ and is an externally thereaded stem to which a nut 39 is applied in clamping cooperation with the wall for mounting the actuating device thereon. The outer sleeve 35, including the hollow stem portion 37 thereof and the clamping nut 39 are electrically isolated from the upright wall portion $14^b$ as by means of the interposed insulating bushing 40 and the interposed insulating disc 41.

The inner sleeve 36 constitutes a driving sleeve which is rotatable in the outer sleeve 35 and is retained therein by means of a retaining ring 42 engaged in an internal groove 43 provided adjacent the inner end of the outer sleeve. The inner sleeve 36 includes an axial shaft portion 44 which projects forwardly through the hollow stem portion 37 and is journalled therein. Rotation can be imparted to the inner sleeve 36 by suitable actuating means cooperating with the shaft portion 44, such as the manually operable knob 45 shown in this instance and which is connected with the shaft portion by means of the transverse pin 46.

The outer sleeve 35 is provided with an axial slot 47 formed in the wall thereof and the inner sleeve 36 is provided with a helical slot 48 formed in the wall thereof and extending in crossing relation to the axial slot. A follower means which is here shown in the form of a radial pin 49 engages in both of these slots at their point of crossing relation and is connected with the carrier member 31 as by engagement in an opening 50 thereof. The engagement of the follower pin 49 in the axial slot 47 holds the carrier member 31 against rotation in the inner sleeve 36, and the engagement of this pin in the helical slot 48 renders the carrier member axially movable in response to the wedging action produced by the helical slot on the pin in response to rotation of the inner sleeve.

From the construction of the tuning device 10 as shown in the drawing and above described, it will be seen that the core member 17 and the inner capacitance member 28 are both carried and actuated by the carrier member 31. It will also be seen that the axial movement imparted to the carrier member 31 by rotation of the inner sleeve 36 causes a simultaneous axial movement of the core member 17 and the inner capacitance member 28 inwardly or outwardly depending upon the direction in which the sleeve 36 is rotated. When the sleeve is rotated in one direction, the core member 17 will be moved inwardly into the inner coil 15 of the variable inductance device 11 to vary the inductance value thereof, and the inner capacitance element 28 will be moved into the outer capacitance member 27 to vary the capacitance value of the variable capacitance device 12. Upon rotation of the sleeve 36 in the opposite direction, the core member 17 will be retracted from the variable inductance device 11 and the inner capacitance member 28 will be retracted from the outer capacitance member 27 and during such retracting movement, the inner capacitance member 28 will move into the actuating device 13 where it will be substantially fully shielded by the latter.

The axial and helical slots 47 and 48 of the actuating device 13 are of a length appropriate for the axial movement desired to be imparted to the core member 17 and the inner capacitance member 28. The helical slot 48 is here shown as being approximately 180° in arcuate extent although, if desired, it can be of a greater or shorter arcuate length. The slope angle of the helical slot 48 can be of any desired value suitable to give the core member 17 and the inner capacitance member 28 a desired rate of axial movement in response to the rotary movement of the driving sleeve 36.

The actuating device 13 preferably also includes visual indicating means such as the graduated dial 52 and the pointer 53 which cooperates with the dial and is arcuately movable adjacent thereto by the knob 45. The dial 52 carries an arcuate series of graduations 54 and is adapted to be mounted on the upright wall portion $14^b$ by the clamping action of the nut 39.

The improved tuning device 10 can be used in various radio circuits such as oscillation circuits of the so-called "tank" type and, as one example of such use, the drawing shows certain conventional radio circuit connections or components which need be only briefly described. These radio circuit components comprise an antenna 55 with which the terminal 22 of the outer coil 16 of the variable inductance device 11 is connected by the conductor 56, and a ground 57 with which the terminals 19 and 21 are connected by conductor means 58. These radio circuit components also include an electron tube 59 having a grid 60 with which the terminal 20 of the variable inductance device 11 and the terminal lug $27^a$ of the variable capacitance device 12 are connected by conductor means 61. Additionally, these radio circuit components include a ground 62 with which the actuating device 13 is connected as represented by the conductor 63.

From the foregoing detailed description and the accompanying drawing it will now be readily understood that this invention provides an improved radio circuit tuning device which can be economically produced and which can be made of such small and compact size that it can be used to advantage in radio apparatus or the like which is of a small or miniature size. It will also be understood that this improved tuning device is applicable to a wide range of signal frequencies and since the rotary travel of the driving sleeve 36 can extend for a full 360 degrees or greater, the graduations of the reference scale 54 of the dial 52 can be relatively widely spaced apart for easier and more accurate reading of the different settings.

Although the improved radio circuit tuning device of this invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a tuning device of the character described, a capacitance element, inductance coil means in adjacent substantially aligned relation to said capacitance element, a pair of nested inner and outer sleeves located in adjacent substantially aligned relation to said capacitance element and inductance coil means and one of said sleeves being rotatable relative to the other sleeve, one of said sleeves having an axial slot in the wall thereof and the other having a helical slot in the wall thereof extending in crossing relation to said axial slot, a carrier member slidably supported by said nested sleeves for movement in an axial direction, core means connected with said carrier member for movement thereby into the magnetic field of said inductance coil means, a second capacitance element connected with said carrier member for movement thereby into a capacitance relation to the first-mentioned capacitance element, and follower means connected with said carrier member and engaging in both slots substantially at their point of crossing relation.

2. In a circuit tuning device of the character described, a pair of sleeves disposed in substantially coextensive coaxial nested relation and comprising a fixed outer sleeve having a hollow stem portion adapted for connection with a support and an inner driving sleeve rotatable in said outer sleeve and having a shaft portion extending through said hollow stem portion, a tubular capacitance element and a hollow inductance coil means disposed in adjacent substantially coaxially aligned relation to said nested sleeves, insulating sleeve means supporting said capacitance element and said hollow coil means in said coaxially aligned relation, a plunger axially slidable in said nested sleeves, a second capacitance element and a core means connected with said plunger for movement thereby into the first-mentioned capacitance element and said hollow coil means, said fixed sleeve having an axial slot in the wall thereof and said driving sleeve having a helical slot in the wall thereof extending in crossing relation to said axial slot, and follower means connected with said plunger and engaging in both slots substantially at their point of crossing relation.

3. In a circuit tuning device of the character described, a support having an opening therein, a pair of sleeves disposed in substantially coextensive coaxial nested relation and comprising a fixed outer sleeve having a hollow stem portion of relatively reduced size extending through the opening of said support and an inner driving sleeve rotatable in said outer sleeve and having a shaft portion extending through said hollow stem portion, retaining means engaging said hollow stem portion and cooperating with said support for connecting said fixed sleeve with the latter, a tubular capacitance element and a hollow inductance coil means disposed in adjacent substantially coaxially aligned relation to said nested sleeves, insulating sleeve means supporting said capacitance element and said hollow coil means in said coaxially aligned relation, a plunger axially slidable in said nested sleeves, a second capacitance element and a core means connected with said plunger for movement thereby into the first-mentioned capacitance element and said hollow coil means, said fixed sleeve having an axial slot in the wall thereof and said driving sleeve having a helical slot in the wall thereof extending in crossing relation to said axial slot, follower means connected with said plunger and engaging in both slots substantially at their point of crossing relation, actuating means connected with said shaft portion for imparting rotary movement to said inner sleeve, stationary indicating means connected with said support and extending arcuately around the axis of said shaft portion, and other indicating means movable by said shaft portion and cooperating with said stationary indicating means.

GEORGE E. MORTON.

References Cited in the file of this patent

UNITED STATES PATENTS

| Number | Name | Date |
|---|---|---|
| 2,398,112 | O'Brien | Apr. 9, 1946 |
| 2,502,202 | Burroughes | Mar. 28, 1950 |

FOREIGN PATENTS

| Number | Country | Date |
|---|---|---|
| 561,787 | Great Britain | June 5, 1944 |